(12) United States Patent
Bertollini et al.

(10) Patent No.: US 10,279,734 B2
(45) Date of Patent: May 7, 2019

(54) SYSTEMS AND METHODS FOR EXTERNAL WARNING BY AN AUTONOMOUS VEHICLE

(71) Applicant: GM GLOBAL TECHNOLOGY OPERATIONS LLC, Detroit, MI (US)

(72) Inventors: Gary P. Bertollini, Lake Orion, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 15/625,006

(22) Filed: Jun. 16, 2017

(65) Prior Publication Data

US 2018/0361918 A1   Dec. 20, 2018

(51) Int. Cl.
| | |
|---|---|
| G01C 22/00 | (2006.01) |
| G05D 1/00 | (2006.01) |
| B60Q 1/52 | (2006.01) |
| B60Q 1/26 | (2006.01) |
| B60Q 5/00 | (2006.01) |
| B60W 30/09 | (2012.01) |
| G05D 1/02 | (2006.01) |
| G08G 1/16 | (2006.01) |

(52) U.S. Cl.
CPC ............ *B60Q 1/525* (2013.01); *B60Q 1/2607* (2013.01); *B60Q 1/2611* (2013.01); *B60Q 5/006* (2013.01); *B60W 30/09* (2013.01); *G05D 1/0055* (2013.01); *G05D 1/021* (2013.01); *G08G 1/166* (2013.01); *B60W 2710/06* (2013.01); *B60W 2710/10* (2013.01); *B60W 2710/18* (2013.01); *B60W 2710/20* (2013.01)

(58) Field of Classification Search
CPC .... B60Q 1/525; B60Q 1/2607; B60Q 1/2611; B60Q 5/006; B60W 30/04; G05D 1/0055; G05D 1/021; G05D 1/0088; G08G 1/166
USPC .......................................................... 701/23
See application file for complete search history.

(56) References Cited

U.S. PATENT DOCUMENTS

2017/0120804 A1*   5/2017   Kentley ............... G05D 1/0088

* cited by examiner

*Primary Examiner* — Mahmoud S Ismail
(74) *Attorney, Agent, or Firm* — Lorenz & Kopf, LLP

(57) ABSTRACT

Systems and method are provided for generating warning signals for an autonomous vehicle. In one embodiment, a method includes: receiving sensor data associated with an environment of the vehicle; determining, by a processor, an encroaching object based on the sensor data; determining, by the processor, an impending event based on the encroaching object; selecting, by the processor, at least one warning device coupled to the vehicle from a plurality of warning devices based on the impending event, wherein the at least one warning device generates warning signals that are perceived outside of the vehicle; and generating, by the processor, an activation signal to the at least one warning device to generate the warning signals based on the impending event.

16 Claims, 5 Drawing Sheets

SYSTEMS AND METHODS FOR EXTERNAL WARNING BY AN AUTONOMOUS VEHICLE

TECHNICAL FIELD

The present disclosure generally relates to autonomous vehicles, and more particularly relates to systems and methods for providing external warnings by an autonomous vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

In some instances, the driving behavior of an autonomous vehicle may be unexpected by a driver of a non-autonomous vehicle. For example, a driver of a vehicle may make certain gestures to other drivers to give the other drivers notice of an upcoming action. A driverless autonomous vehicle cannot make such human gestures.

Accordingly, it is desirable to provide systems and methods that for providing external warnings, that is, warnings to others by an autonomous vehicle. Furthermore, other desirable features and characteristics of the present invention will become apparent from the subsequent detailed description and the appended claims, taken in conjunction with the accompanying drawings and the foregoing technical field and background.

SUMMARY

Systems and method are provided for generating warning signals for an autonomous vehicle. In one embodiment, a method includes: receiving sensor data associated with an environment of the vehicle; determining, by a processor, an encroaching object based on the sensor data; determining, by the processor, an impending event based on the encroaching object; selecting, by the processor, at least one warning device coupled to the vehicle from a plurality of warning devices based on the impending event, wherein the at least one warning device generates warning signals that are perceived outside of the vehicle; and generating, by the processor, an activation signal to the at least one warning device to generate the warning signals based on the impending event.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
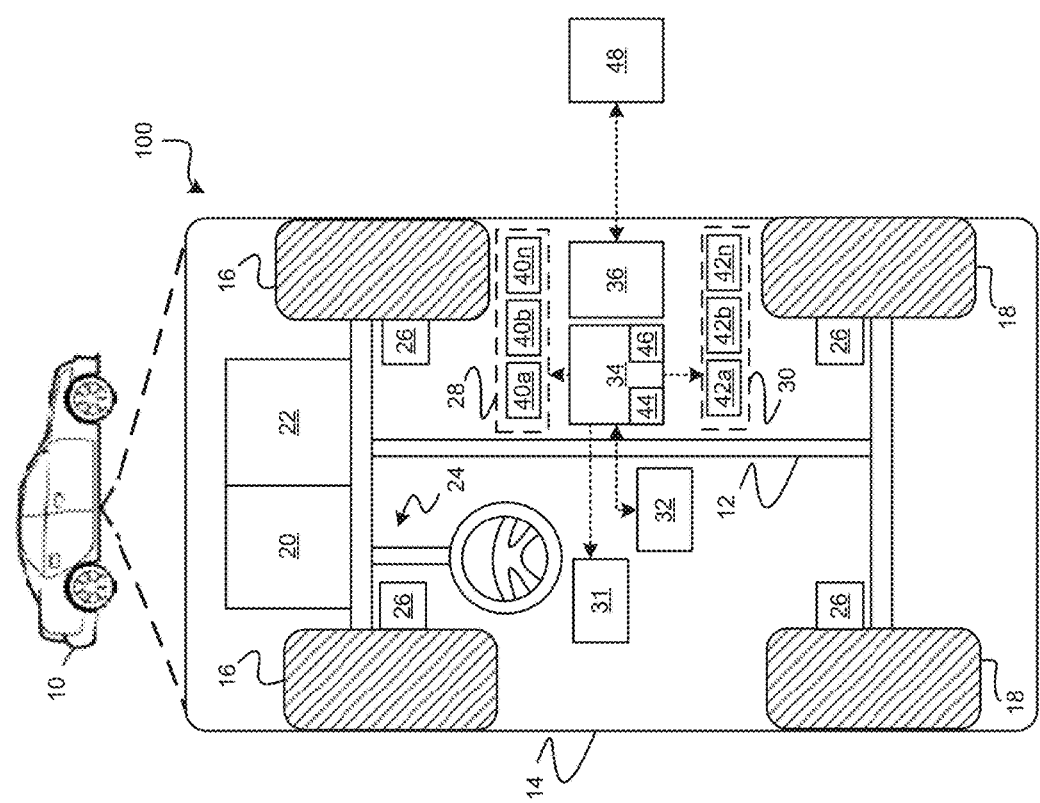
FIG. 1A is a functional block diagram illustrating an autonomous vehicle having a warning system, in accordance with various embodiments.

With reference to FIG. 1A, a warning system shown generally at 100 is associated with a vehicle 10 in accordance with various embodiments. In general, the warning system 100 detects objects, predicts an impending event based on the detected objects, and intelligently controls warning devices and/or the vehicle 10 based thereon. In various embodiments, an impending event refers to an event in which a detected object is predicted to be at or travel to a location within the current path of the vehicle at or near a time when the vehicle will be traveling along the path.

As depicted in FIG. 1A, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the warning system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, a plurality of warning devices 31, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features controlled by the one or more actuator devices 42a-42n can further include interior and/or exterior vehicle features such as, but are not limited to, doors, a trunk, and cabin features such as air, music, lighting, etc. (not numbered).

The warning devices 31 can include, but are not limited to, visual warning devices (e.g., LED lights, or other lights), audio warning devices, and/or other sensory related warning devices that generate a signal that is perceivable by a human being. [Inventors: are there preferred warning devices? Can you provide examples?] The warning devices 31 are coupled to an exterior of the body 14 of the vehicle 10 and/or coupled to an interior of the vehicle 10 such that they may issue warning signals that are perceivable to one or more individuals associated with one or more detected objects outside of the vehicle 10. The warning devices 31 are selectively located throughout the vehicle 10 such that one or a certain set of warning devices 31 are selected to direct the warning signals specifically at the individual associated with the respective one of the detected objects.

Figure 1B:
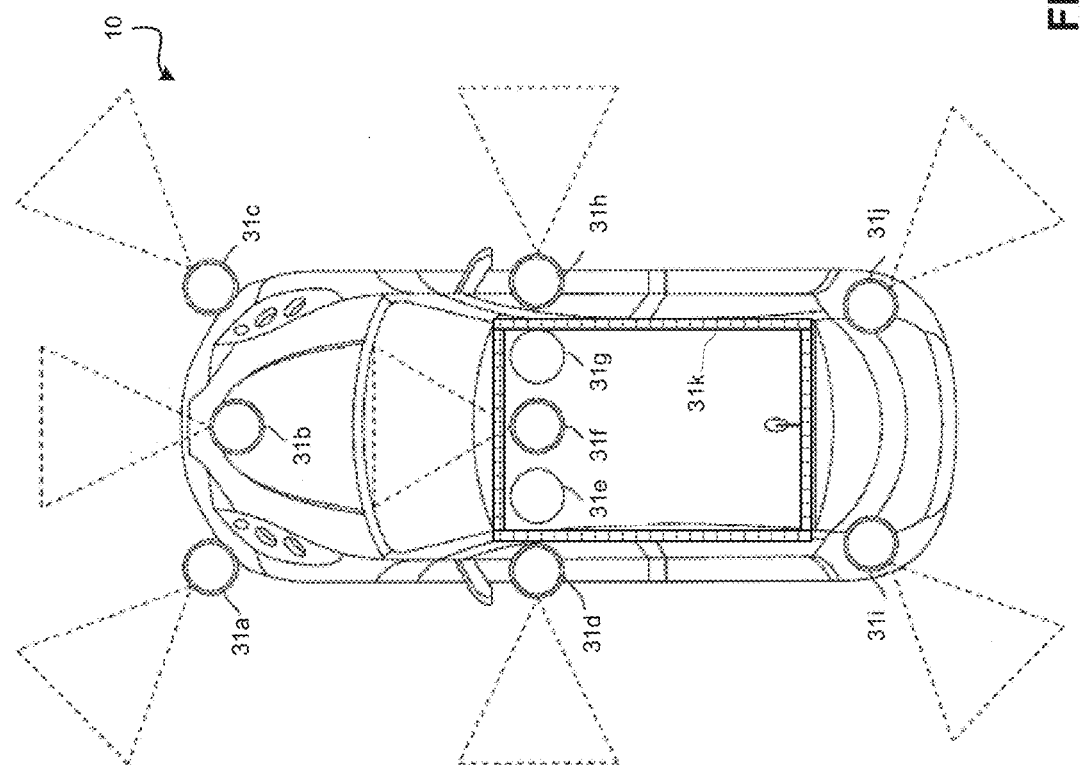
FIG. 1B is an illustration of warning devices of the warning system distributed about the autonomous vehicle, in accordance with various embodiments.

For example, an exemplary embodiment of warning devices 31 distributed about the vehicle 10 shown in FIG. 1B. As shown, warning devices 31a-31j (or any number of warning devices 31) are disposed at different locations and oriented to provide different warning signals to different portions of the surrounding environment in the vicinity of the vehicle 10. As can be appreciated, the warning devices 31a-31j can be all of the same type of warning device or be a combination of any of the types of warning devices. In the provided example, a first warning device 31a is positioned at the front left (or driver) side of the vehicle 10 and is oriented 45° counterclockwise relative to the longitudinal axis of the vehicle 10 in the forward direction, and another warning device 31c may be positioned at the front right (or passenger) side of the vehicle 10 and is oriented 45° clockwise relative to the longitudinal axis of the vehicle 10. Additional warning devices 31i, 31j are positioned at the rear left and right sides of the vehicle 10 and are similarly oriented at 45° counterclockwise and clockwise relative to the vehicle longitudinal axis, along with warning devices 31d and 31h positioned on the left and right sides of the vehicle 10 and oriented away from the longitudinal axis so as to extend along an axis that is substantially perpendicular to the vehicle longitudinal axis. The illustrated embodiment also includes a group of warning devices 31e-31g positioned at or near the vehicle longitudinal axis and oriented to provide forward direction signals in line with the vehicle longitudinal axis.

In various embodiments, in addition to the warning devices 31a-31j or as an alternative to the warning devices 31a-31j the warning device 31 may comprise a strip of lights 31k such as multicolored and addressable LED lights. As shown the strip of lights 31k can be coupled to a roof line or belt line of the vehicle 10. As shown, the strip of lights 31k can be coupled to the roof in a continuous 360 degree strip; and each of the lights within the strip of light may be associated with a zone or region of the vehicle 10. As can be appreciated, other warning devices (not shown) may be implemented in various embodiments.

Figure 2:
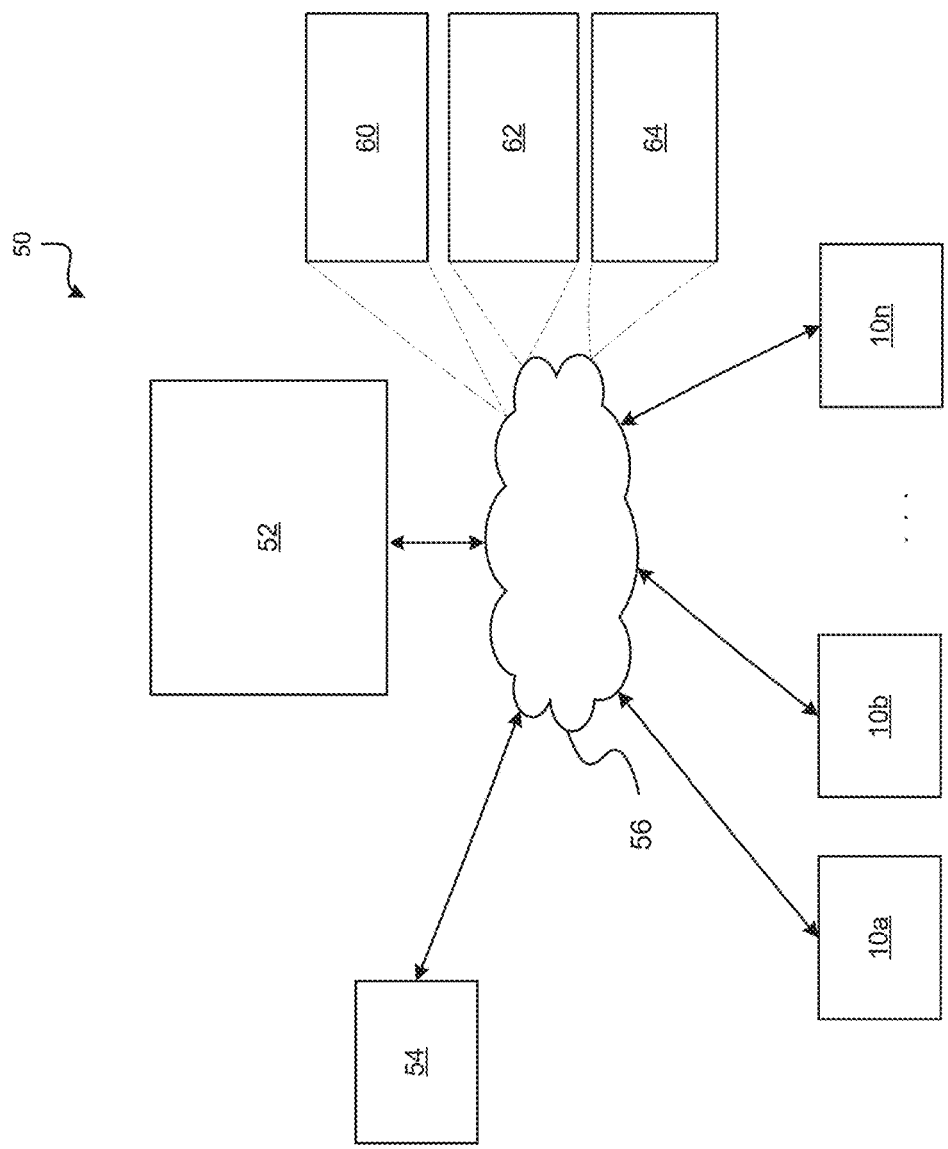
FIG. 2 is a functional block diagram illustrating a transportation system having one or more autonomous vehicles of FIG. 1A, in accordance with various embodiments.

With reference back to FIG. 1A, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1A, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the warning system 100 and, when executed by the processor 44, detect objects in vicinity to the vehicle 10, predict an impending event with the object, and selectively control the warning devices and/or the vehicle 10 such that the impending event can be avoided or results of the impending event can be reduced.

With reference now to FIG. 2, in various embodiments, the autonomous vehicle 10 described with regard to FIG. 1A may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1A. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent sub scriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
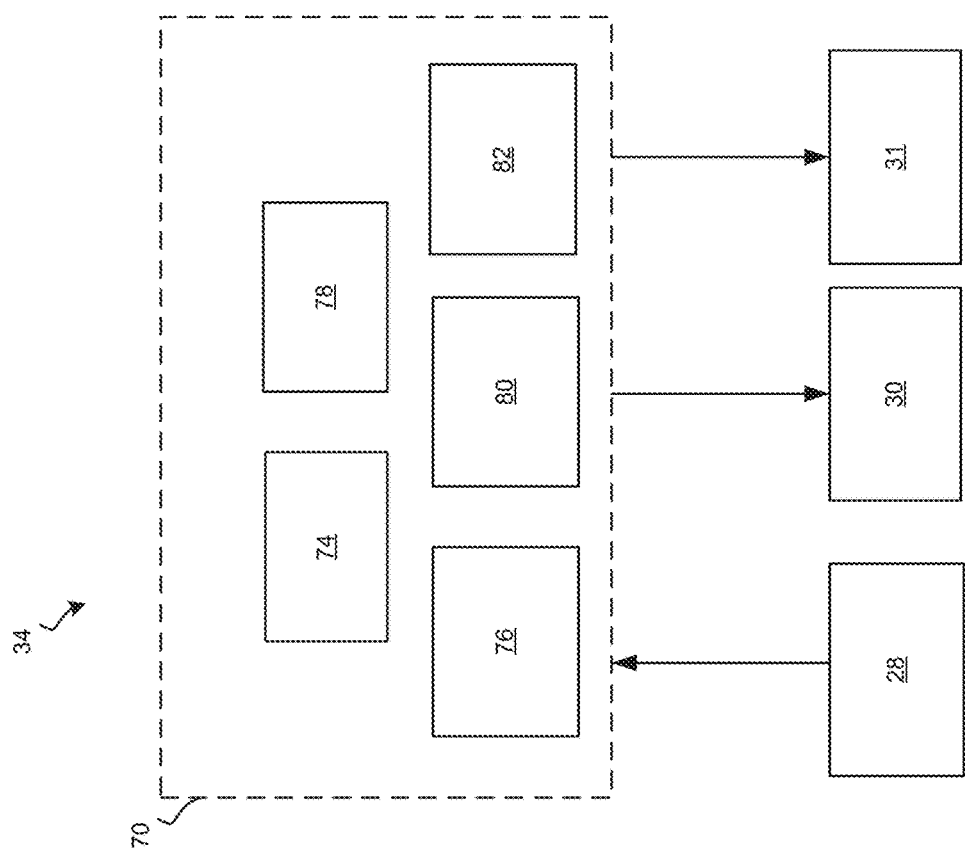
FIG. 3 is a dataflow diagram illustrating an autonomous driving system that includes the warning system of the autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data from the sensors 40a-40n (FIG. 1A) and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, a certain portion of the warning system 100 of FIG. 1A is included within the ADS 70, for example, as the warning system 82. In various embodiments, the warning system 82 communicates with the computer vision system 74, the positioning system 76, the guidance system 78, and the vehicle control system 80 to detect objects in vicinity of the vehicle 10, to predict and impending event with a detected object, and to selectively control one or more of the warning devices 31 and/or the actuator system 30.

For example, the computer vision system 74 provides to the warning system 82 data indicating detected objects within a vicinity of the vehicle 10 (e.g., detected by way of image processing and/or machine learning classification techniques) and a predicted path of the objects (e.g., determined based on the classification of the object and machine learning techniques). In another example, the positioning system 76 provides to the warning system 82 a current location of the vehicle 10 in relation to a map and in further relation to a lane on a road of the map. In still another example, the guidance system 78 provides to the warning system 82 a path along the lane of the road that is planned by the vehicle 10. In still another example, the warning system 82 communicates directly to the warning devices 31 to activate the warning devices such that they generate a warning that is perceivable by an individual associated with the detected object. In still another example, the warning system 82 communicates with the vehicle control system 80 to control one or more of the actuator devices of the actuator system 30 to cause the vehicle 10 to be controlled in a manner that minimizes any results of an impending event.

Figure 4:
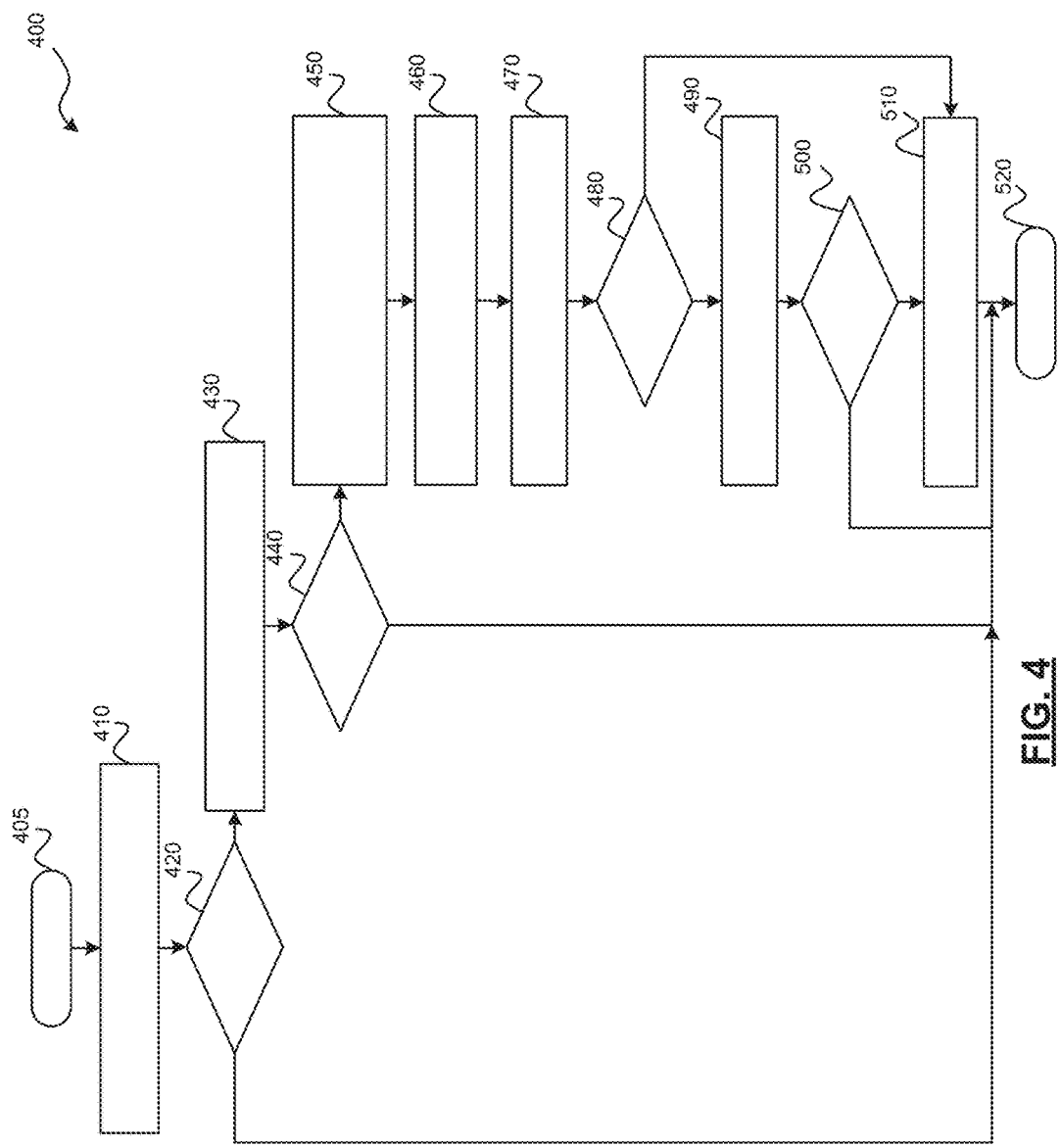
FIG. 4 is a flowchart illustrating a control method for controlling the autonomous vehicle, in accordance with various embodiments.

For example, as shown in more detail with regard to FIG. 4 and with continued reference to FIGS. 1A, 1B, and 3, a flowchart illustrates a control method 400 that can be performed by the warning system 82 of FIG. 3 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method may begin at 405. The current location of the vehicle 10 and the planned path of the vehicle 10 are compared to the location of the detected objects, and the predicted trajectories of the objects to determine whether one or more of the detected objects will encroach upon the upcoming path of the vehicle 10 at 410. For example, the path and the trajectories can be defined in a three-dimensional coordinate system and when a defined trajectory intersects with the defined path, the object associated with the trajectory is determined to be encroaching.

When an object is determined to an encroaching object at 420, it is determined whether the predicted trajectory of the encroaching object will cause an impending event at 430. For example, a timing of the object passing along the trajectory can be compared to a timing associated with the vehicle 10 along the path at 420 and if the timing of the object is within a range of the timing of the vehicle 10, the encroaching object is determined to cause an impending event.

When an impending event is detected at 440, certain warning devices 31 of the vehicle 10 are selected based on a location of the detected object, a trajectory of the object, and a current location of the vehicle 10 at 450. For example, certain warning devices 31 that are located on a side of the vehicle 10 closest to a location of the object can be selected to viewable by an individual associated with the object. In another example, the location of the warning devices 31 can be associated with a location of the sensor device 10a-10n and selection of the warning devices 31 is based on the associated sensor devices 40a-40n that sensed the object. In another example, a zone of the warning device 31 can be selected based on the location of the location of the object with respect to the vehicle. As can be appreciated, the selection can be made on various criteria and is not limited to the present examples.

Control signals are generated to activate the selected warning devices at 460, the warning devices, in response, generate warning signals. In various embodiments, the control signals are generated based on a computed severity or probability of the event. For example, attributes of the warning device may be adjusted by the control signals such that a frequency of flashing is adjusted, a color is changed, or a sound intensity or frequency is adjusted based on the computed severity or probability.

Thereafter, additional sensor data is received and processed at to determine if the warning signal was perceived and a response was taken by an individual associated with the object to prevent the impending event at 470. If the impending event still exists at 480, control signals are generated to the actuator system 30 to control one or more of the propulsion system 20, the transmission system 22, the steering system 24, and/or the brake system 26 such that results of the impending event are minimized at 490. IF the impending event occurred at 500 despite the mitigation actions, control signals are generated to activate the warning devices at 510 such that those involved in the event are warned that they have been identified as being involved in or in the immediate vicinity of the event. Thereafter, the method may end at 520.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of generating warning signals for an autonomous vehicle, comprising:
   receiving sensor data associated with an environment of the vehicle;
   determining, by a processor, an encroaching object based on the sensor data;
   determining, by the processor, an impending event based on the encroaching object;
   selecting, by the processor, at least one warning device from a plurality of warning devices coupled to the vehicle based on the impending event, wherein the at least one warning device generates warning signals that are perceived outside of the vehicle; and
   generating, by the processor, an activation signal to the at least one warning device to generate the warning signals based on the impending event;
   receiving second sensor data associated with the environment of the vehicle;
   determining, by the processor, whether the warning signals were perceived and a response taken by an individual associated with the encroaching object based on the second sensor data; and selectively generating, by the processor, control signals to an actuator system to control a component of the vehicle based on the determination of whether the warning signals were perceived and a response taken.

2. The method of claim 1, wherein the selecting the at least one warning device is based on a location of the encroaching object relative to the autonomous vehicle.

3. The method of claim 1, wherein the selecting the at least one warning device is based on a predicted trajectory of the encroaching object relative to the autonomous vehicle.

4. The method of claim 1, wherein the selecting the at least one warning device is based on a location of the warning device relative to the vehicle.

5. The method of claim 1, wherein the at least one warning device is an audio warning device that generates audio warning signals.

6. The method of claim 1, wherein the at least one warning device is a visual warning device that generates visual warning signals.

7. The method of claim 1, wherein the vehicle system is at least one of a steering system, a brake system, an engine system, and a transmission system.

8. A system for generating warning signals for an autonomous vehicle, comprising:
   a non-transitory computer readable medium comprising:
   a first module configured to, by a processor, receive sensor data associated with an environment of the vehicle, and determine an encroaching object based on the sensor data;
   a second module configured to, by a processor, determine an impending event based on the encroaching object;
   a third module configured to, by a processor, select at least one warning device from a plurality of warning devices based on the impending event, wherein the at least one warning device generates warning signals that are perceived outside of the vehicle, and generate an activation signal to the at least one warning device to generate warning signals based on the impending event; and
   a fourth module configured to, by a processor, receive second sensor data associated with the environment of the vehicle, determine, whether the warning signals were perceived and a response taken by an individual associated with the encroaching object based on the second sensor data, and selectively generate control signals to an actuator system to control a component of the vehicle based on the determination of whether the warning signals were perceived and a response taken.

9. The system of claim 8, wherein the third module selects the at least one warning device based on a location of the encroaching object relative to the autonomous vehicle.

10. The system of claim 8, wherein the third module selects the at least one warning device based on a predicted trajectory of the encroaching object relative to the autonomous vehicle.

11. The system of claim 8, wherein third module selects the at least one warning device based on a location of the warning device relative to the vehicle.

12. The system of claim 8, wherein the at least one warning device is an audio warning device that generates audio warning signals.

13. The system of claim 8, wherein the at least one warning device is a visual warning device that generates visual warning signals.

14. The system of claim 13, wherein the warning device is a strip of lights coupled to a roof of the vehicle, and wherein the strip of lights includes a plurality of zones that are selectively actuated based on the activation signal.

15. The system of claim 8, wherein the vehicle system is at least one of a steering system, a brake system, an engine system, and a transmission system.

16. A vehicle, comprising:
   a plurality of warning devices distributed about the vehicle, the warning devices generate warning signals that are perceived outside of the vehicle; and
   a controller that is configured to, by a processor, receive sensor data associated with an environment of the vehicle, determine an encroaching object based on the sensor data, determine an impending event based on the encroaching object, select at least one warning device from the plurality of warning devices based on the impending event, generate an activation signal to the at least one warning device to generate the warning signals based on the impending event, receive second sensor data associated with the environment of the vehicle, determine, whether the warning signals were perceived and a response taken by an individual associated with the encroaching object based on the second sensor data, and selectively generate control signals to an actuator system to control a component of the vehicle based on the determination of whether the warning signals were perceived and a response taken.

* * * * *